(12) United States Patent
Lin (10) Patent No.: US 8,360,663 B1
(45) Date of Patent: Jan. 29, 2013

(54) CAMERA ASSEMBLY CAPABLE OF ADJUSTING ANGLE OF CAMERA

(75) Inventor: Hung-Ting Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 54 days.

(21) Appl. No.: 13/195,862

(22) Filed: Aug. 2, 2011

(30) Foreign Application Priority Data

Jul. 4, 2011 (TW) .................................. 100212188

(51) Int. Cl.
*G03B 17/00* (2006.01)
(52) U.S. Cl. ........................................................ 396/428
(58) Field of Classification Search .................... 396/428
See application file for complete search history.

(56) References Cited

U.S. PATENT DOCUMENTS

| | | | |
|---|---|---|---|
| 7,918,613 B2 * | 4/2011 | Wang et al. ................... | 396/411 |
| 7,927,026 B2 * | 4/2011 | Zhang ........................... | 396/428 |
| 2007/0230946 A1 * | 10/2007 | Kimura ......................... | 396/428 |
| 2010/0247090 A1 * | 9/2010 | Fang et al. .................... | 396/428 |
| 2011/0026913 A1 * | 2/2011 | Dumm ........................... | 396/428 |

* cited by examiner

*Primary Examiner* — Rodney Fuller
(74) *Attorney, Agent, or Firm* — Altis Law Group, Inc.

(57) ABSTRACT

A camera assembly mounted in an electronic device comprises a hollow base, a first gear, a first shaft, a second gear, a second shaft, a driving device and a driving gear. The camera is received in the base and rotatably connected to the base. One end of the first shaft is fixed with the first gear, another end of the first shaft is rotatably connected with the camera. One end of the second shaft is fixed with the base, another end of the second shaft is fixed with the second gear. The driving device drives the driving gear to engage with the first gear and the second gear, respectively, which lead to the camera capable of rotating around an axis of the first shaft and an axis of the second shaft, respectively.

20 Claims, 7 Drawing Sheets

CAMERA ASSEMBLY CAPABLE OF ADJUSTING ANGLE OF CAMERA

BACKGROUND

1. Technical Field

The disclosure generally relates to camera assemblies, and more particularly to a camera assembly capable of adjusting an angle of a camera.

2. Description of Related Art

Generally, a camera of an internet protocol (IP) phone is fixed to a base of the IP phone. To adjust the camera, an user can either manually adjust a stand of the IP phone or move the base of the IP phone to make the camera aim at a target image. However, this manual method is cumbersome and ineffective for more precise measurements.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
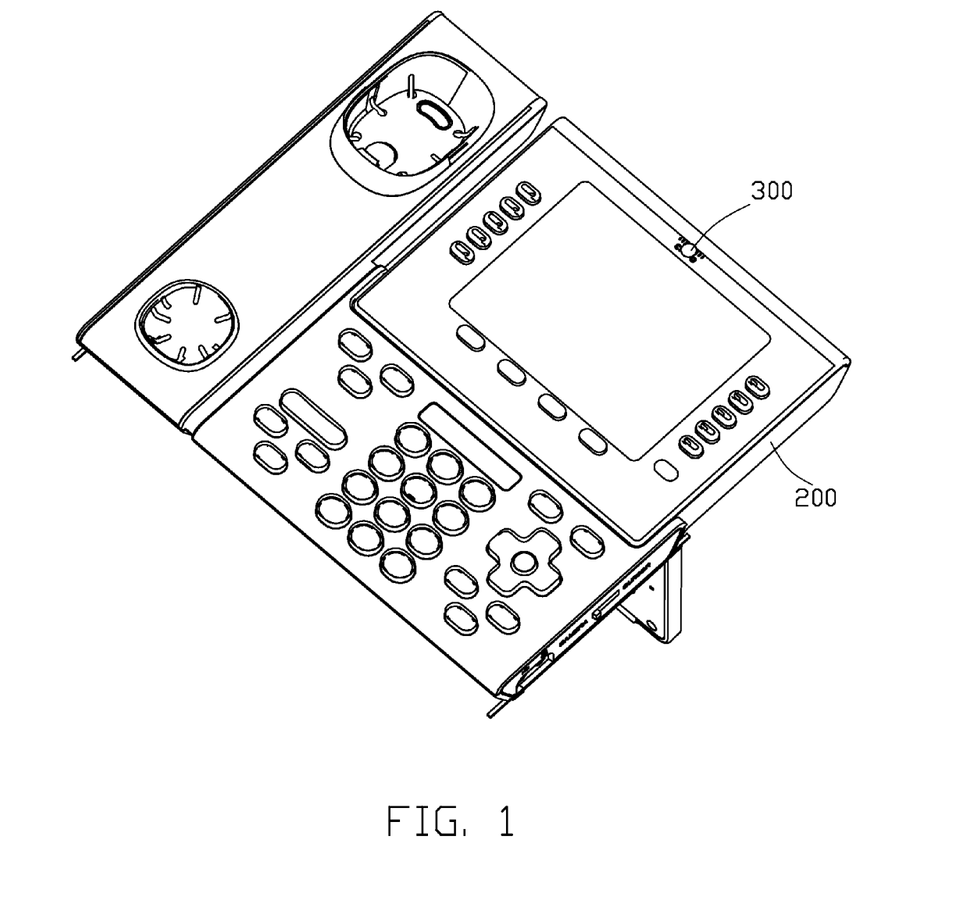
FIG. 1 is a perspective, isometric view of an electronic device of an exemplary embodiment of the disclosure, in which the electronic device comprises a camera to shoot a target image.
Figure 2:
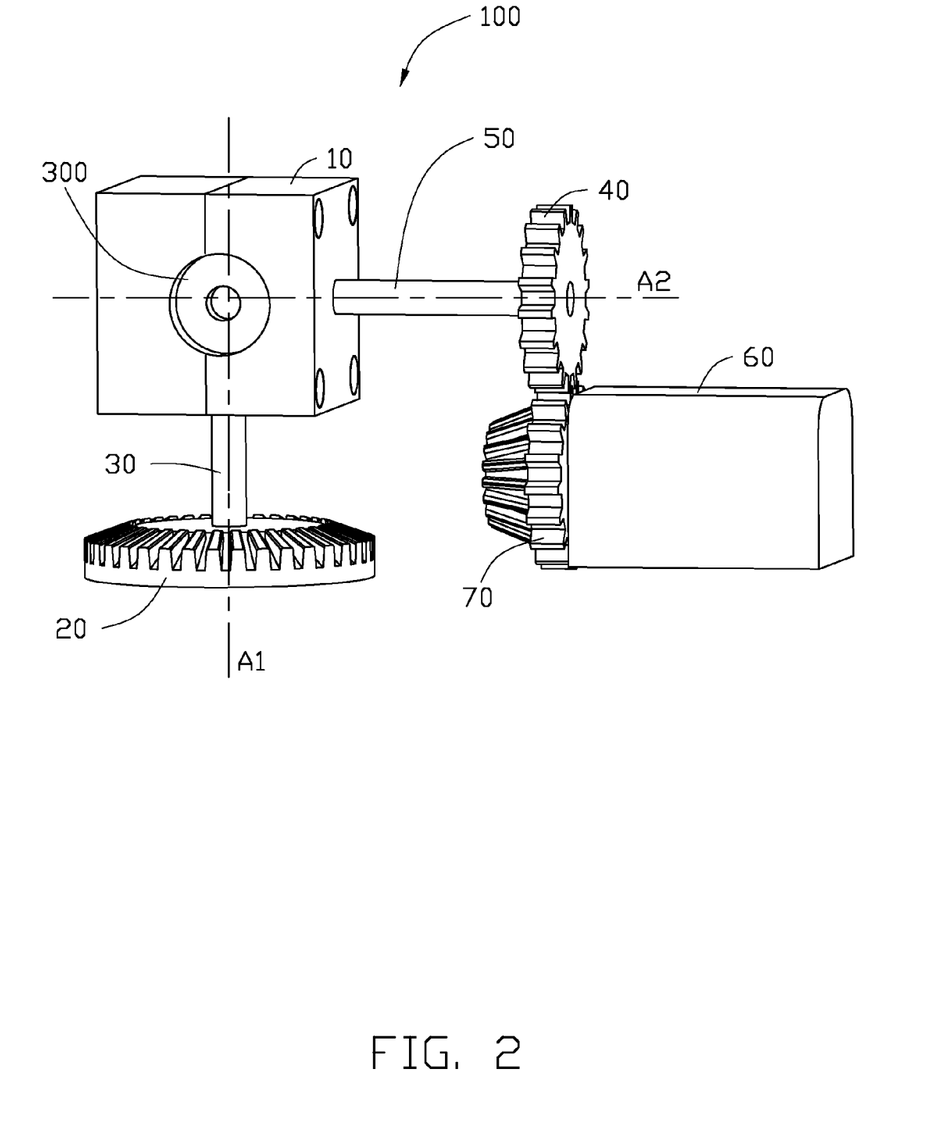
FIG. 2 is a perspective, isometric view of a camera assembly of the disclosure, in which the camera assembly is mounted in the electronic device of FIG. 1, and the camera rotates around an axis of the second shaft.

FIG. 1 is a perspective, isometric view of an electronic device 200 of the disclosure. FIG. 2 is a perspective, isometric view of a camera assembly 100 with an exemplary embodiment of the disclosure. The electronic device 200 comprises a camera 300 to shoot a target image. The camera assembly 100 is mounted in the electronic device 200 to adjust the camera 300 to aim at the target image. In the embodiment, the electronic device 200 is an internet protocol (IP) phone.

The camera assembly 100 comprises a hollow base 10, a first gear 20, a first shaft 30, a second gear 40, a second shaft 50, a driving device 60 and a driving gear 70. The camera 300 is received in the base 10 and rotatably connected to the base 10. One end of the first shaft 30 is fixed with the first gear 20, another end of the first shaft 30 is rotatably connected with the camera 300. One end of the second shaft 50 is fixed with the base 10, another end of the second shaft 50 is fixed with the second gear 40. In the embodiment, the first shaft 30 and the second shaft 50 are perpendicular with each other. The driving device 60 drives the driving gear 70 to engage with the first gear 20 and the second gear 40, respectively, which lead to the camera 300 capable of rotating around an axis A1 of the first shaft 30 and an axis A2 of the second shaft 50, respectively. By this way, the camera 300 is adjusted to aim at the target image.

Figure 3:
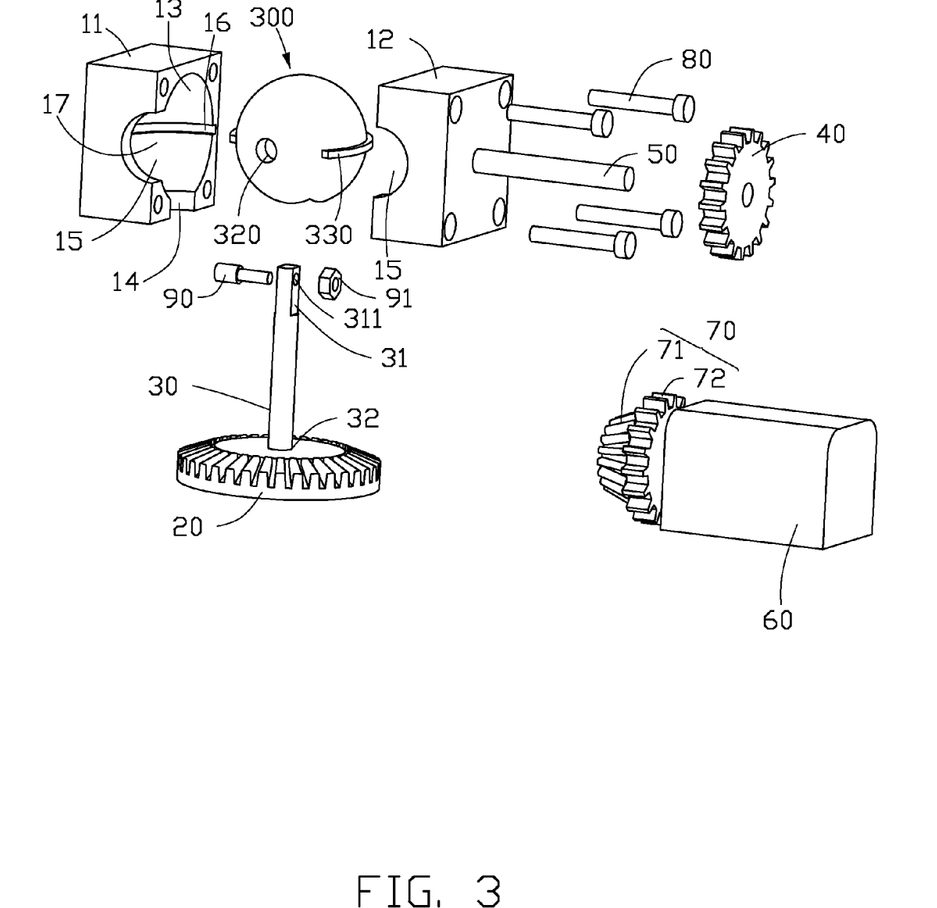
FIG. 3 is a disassembled perspective view of FIG. 2.
Figure 4:
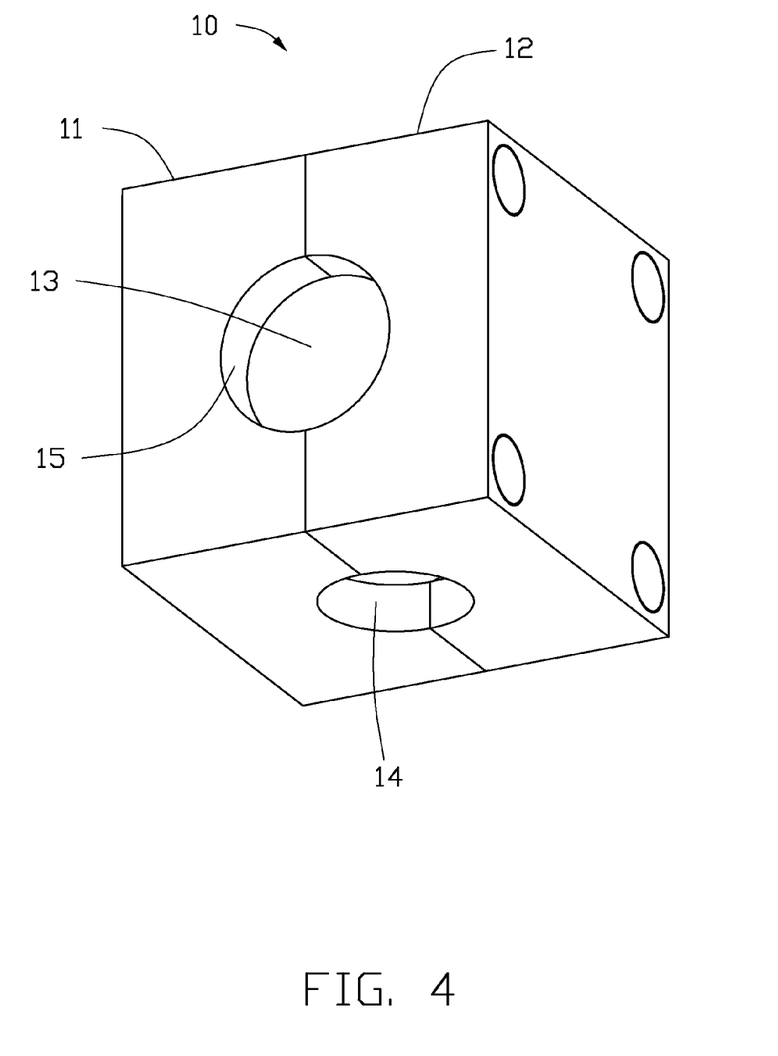
FIG. 4 is a perspective, isometric view of a base of FIG. 2.

With reference to FIG. 3 and FIG. 4, the base 10 comprises a first base 11 and a second base 12. The first base 11 and the second base 12 are fixed together by a plurality of bolts 80 to collectively form a receiving space 13 to receive the camera 300. The base 10 defines a first hole 14, a second hole 15 and a groove 16 in an interior wall 17 of the base 10. The first hole 14, the second hole 15 and the groove 16 are all communicating with the receiving space 13.

Figure 5:
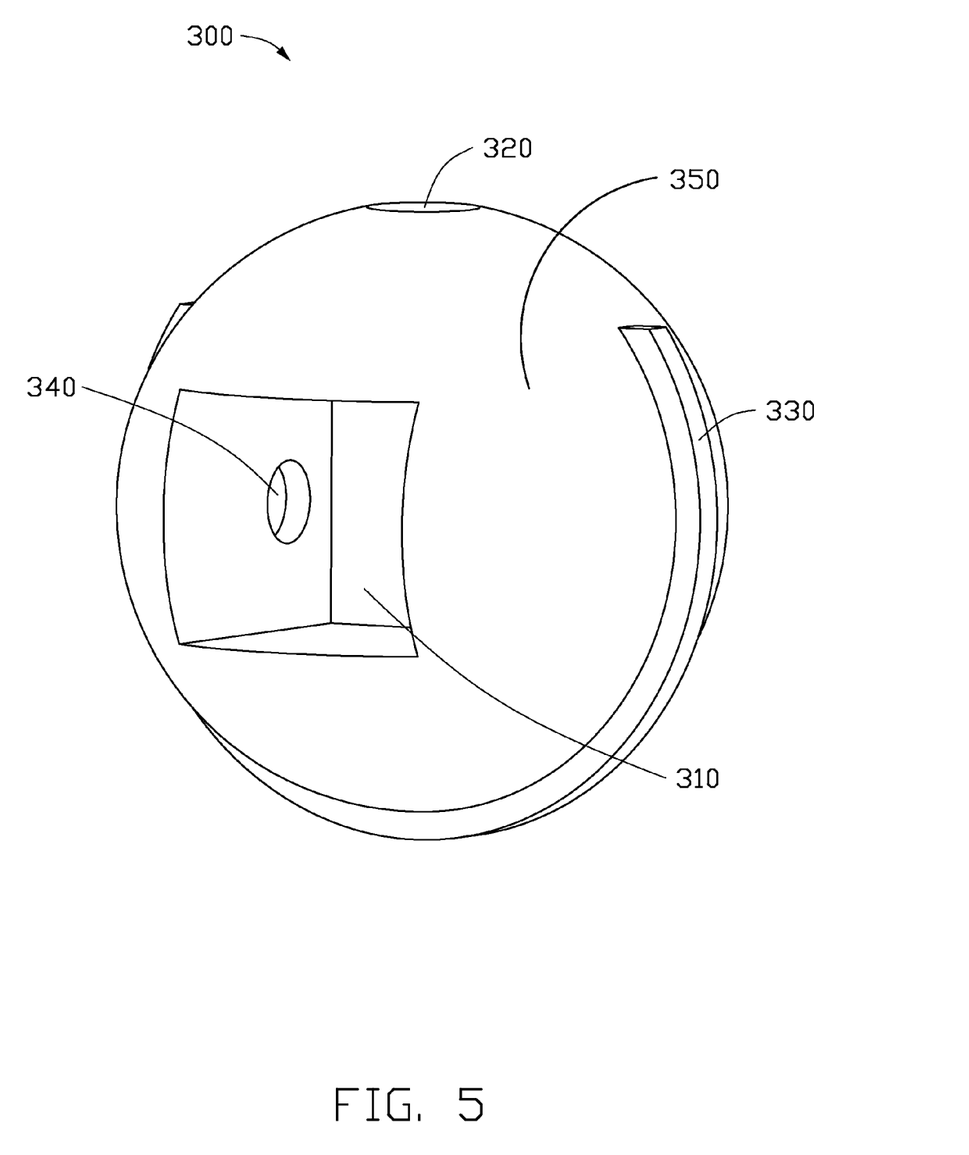
FIG. 5 is a perspective, isometric view of the camera of FIG. 1.

With reference to FIG. 5, the camera 300 comprises a lens 320 to aim at the target image, and a protruding portion 330 projecting from an exterior surface 350 of the camera 300. The camera 300 defines a receiving hole 310, and a third hole 340 communication with the receiving hole 310. In assembly, the camera 300 is received in the receiving space 13 of the base 10 with the receiving hole 310 of the camera 300 opposite to the first hole 14 of the base 10, the lens 320 of the camera 30 opposite to the second hole 15, and the protruding portion 330 of the camera 30 received in the groove 16 of the base 10 and capable of sliding along the groove 16. By this way, when the camera 300 rotates around the axis A1 of the first shaft 30, the camera 300 can rotate along the groove 16 of the base 10 with the lens 320 of the camera 300 moving toward the second hole 15 of the base 10. When the camera 300 rotates around the axis A2 of the second shaft 50, the camera 300 fails to move relative to the base 10 by engagement of the protruding portion 330 of the camera 300 and the groove 16 of the base 10, which leads to the camera 300 rotating around the axis of the second shaft 50 together with the base 10.

In the embodiment, the protruding portion 320 of the camera 300 is substantially in a shape of an arc, and the center of the arc is located in the axis A1 of the first shaft 30. The camera 300 is substantially in a shape of a ball, and receiving space 13 is correspondingly ball shaped.

Figure 6:
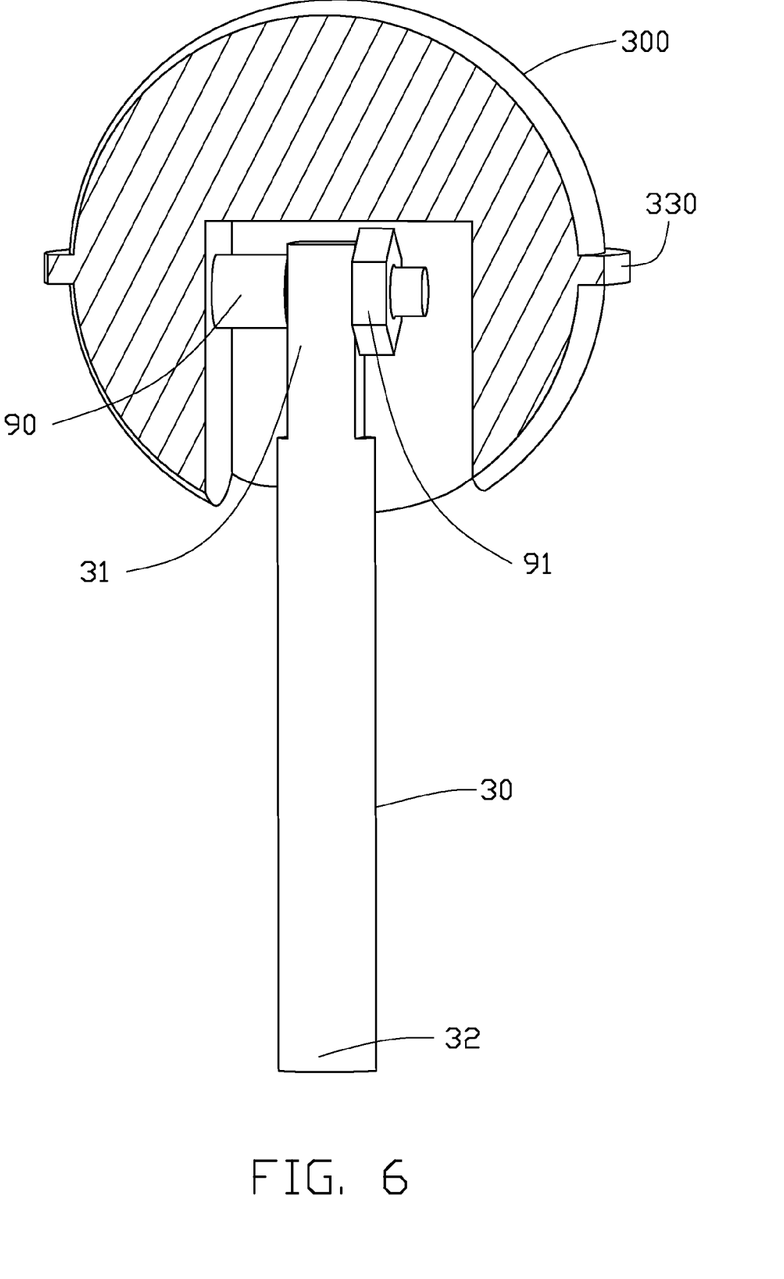
FIG. 6 is a sketching view of a connection relationship between the camera and a first shaft.

Referring to FIG. 3, the first shaft 30 comprises a first end 31 defining a through hole 311, and a second end 32 fixed with the first gear 20. Referring to FIG. 6, in assembly, the first end 31 passes through the first hole 14 of the base 10 and extends into the receiving hole 310 of the camera 300. One end of a third shaft 90 inserts through the through hole 311 of the first shaft 30 and extends into the third hole 340 of the camera 300, and another end of the third shaft 90 matches with a nut 91. An axis of the third shaft 90 is collinear with that of the second shaft 50. By this way, the camera 300 is fixed with the third shaft 90 and capable of rotating relatively to the first shaft 30 around the axis of the third shaft 90. When the camera 300 rotates around the axis A2 of the second shaft 50 together with the base 10, the third shaft 90 rotates in the through hole 311 of the first shaft 30, which keeps the first shaft 30 quiescence.

Figure 7:
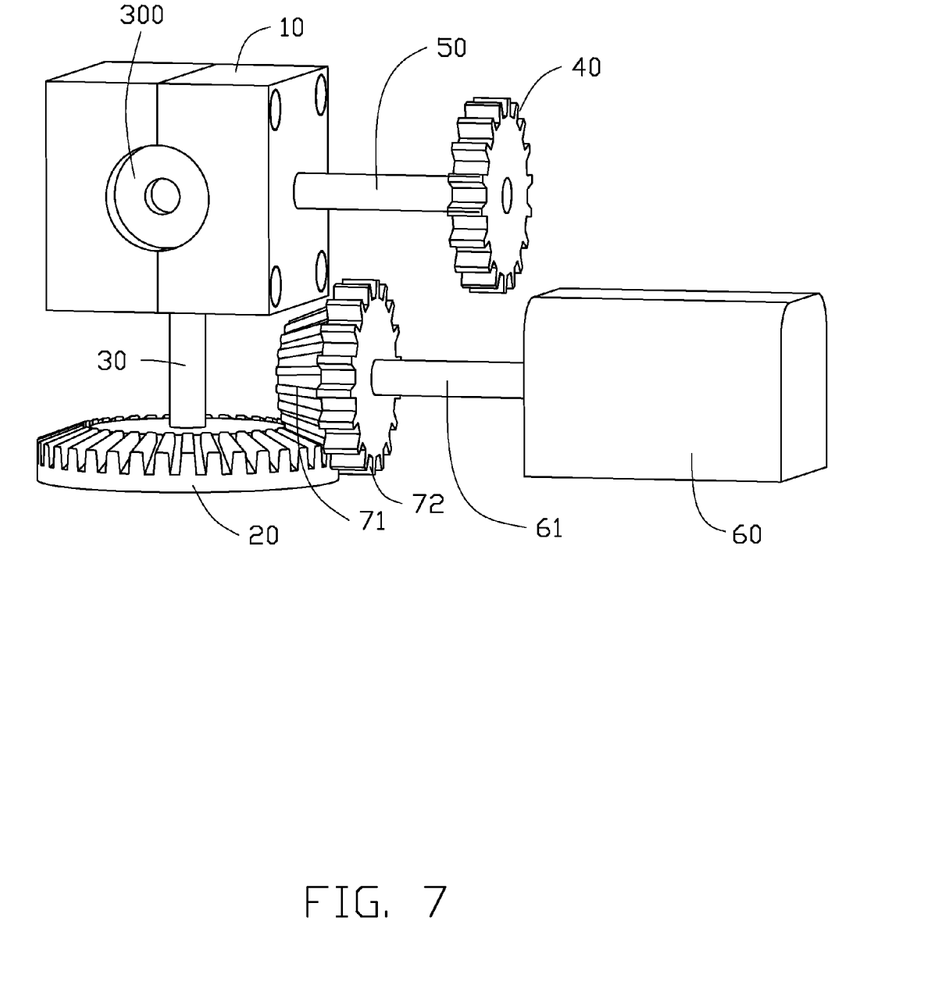
FIG. 7 is a perspective, isometric view of the camera assembly of the disclosure, in which the camera rotates around an axis of the first shaft.

With reference to FIG. 7, the driving device 60 comprises an output shaft 61. The driving gear 70 is fixed to the output shaft 61. The driving device 60 controls the output shaft 61 moving by a controlling device (not shown), which lead to the driving gear 70 moving along the output shaft 61 to engage with the first gear 20 and the second gear 40, respectively.

In the embodiment, the driving device 60 is a step motor. The driving gear 70 comprises a first driving gear 71 engaged with the first gear 20, and a second driving gear 72 integrated with the first driving gear 71 and engaged with the second gear 40. The first driving gear 71 and the first gear 20 are umbrella gears, the second driving gear 72 and the second the second gear 40 are spur gears.

In use, to adjust the camera 300 of the electronic device 200, the driving device 60 drives the driving gear 71 to engage with the first gear 20, which lead to the first gear 20 and the first shaft 30 rotating. As a result, the camera 300 rotates around the axis A1 of the first shaft 30, to adjust the angle of the lens 320 right and left. When the driving device 60 drives the second driving gear 72 to engage with the second gear 40, which lead to the second gear 40 and the second shaft 50 rotating, and the camera 300 and the base 10 rotate around the axis A2 of the second shaft 50 together to adjust the angle of the lens 320 up and down. By this way, the lens 320 of the camera 300 aims at the target image with precise measurements effectively.

While the exemplary embodiments have been described, it should be understood that it has been presented by way of example only and not by way of limitation. The breadth and scope of the disclosure should not be limited by the described exemplary embodiments, but only in accordance with the following claims and their equivalents.

What is claimed is:

1. A camera assembly, comprising:
   a camera comprising a lens and defining a receiving hole;
   a base comprising a first base, and a second base fixed with the first base together to collectively form a receiving space to receive the camera rotatably, the base defining a first hole and a second hole both communicating with the receiving space, wherein the receiving hole is opposite to the first hole, and the lens is opposite to the second hole;
   a first gear;
   a first shaft, one end of the first shaft passing through the first hole of the base and extending into the receiving hole of the camera to engage with the camera, another end fixed with the first gear;
   a second gear;
   a second shaft perpendicular to the first shaft and fixed between the base and the second gear;
   a driving gear; and
   a driving device comprising an output shaft fixed with the driving gear, the driving device driving the driving gear to move along the output shaft to respectively engage with the first gear and the second gear;
   wherein when the driving device drives the driving gear to engage with the first gear, the first gear and the first shaft rotate causing the camera to rotate around an axis of the first shaft;
   wherein when the driving device drives the driving gear to engage with the second gear, the second gear and the second shaft rotate causing the camera to rotate around an axis of the second shaft together with the base.

2. The camera assembly as claimed in claim 1, wherein the driving device is a step motor.

3. The camera assembly as claimed in claim 1, wherein the base defines a groove communicating with the receiving space of the base, and the camera comprises a protruding portion projecting from an exterior surface of the camera and received in the groove, and wherein when the camera rotates around the axis of the first shaft, the camera rotates along the groove of the base, and when the base rotates around the axis of the second shaft, the camera rotates together with the base by engagement of the protruding portion and the groove.

4. The camera assembly as claimed in claim 3, wherein the protruding portion is substantially in a shape of arc, and a center of the arc is located on the axis of the first shaft.

5. The camera assembly as claimed in claim 4, wherein the camera defines a third hole communication with the receiving hole of the camera, and the first shaft defines a through hole, and wherein one end of a third shaft received in the third hole of the camera to be fixed with the camera, another end of the third shaft passes through the through hole of the first shaft and is matched with a nut, and wherein an axis of the third shaft is collinear with that of the second shaft.

6. The camera assembly as claimed in claim 1, wherein the driving gear comprises a first driving gear and a second driving gear integrated with the first driving gear, and the first driving gear engages with the first gear, the second driving gear engages with the second gear.

7. The camera assembly as claimed in claim 6, wherein the first driving gear and the first gear are umbrella gears, and the second driving gear and the second gear are spur gears.

8. A camera assembly, comprising:
   a camera comprising a lens and defining a receiving hole;
   a hollow base defining a receiving space to receive the camera, a first hole and a second hole both communicating with the receiving space, wherein the receiving hole is opposite to the first hole and the lens is opposite to the second hole, and the camera is capable of rotating relatively to the base;
   a first shaft, one end of the first shaft passing through the first hole and extending into the receiving hole of the camera to engage with the camera, and another end fixed with a first gear;
   a second shaft perpendicular to the first shaft, wherein one end of the second shaft is fixed with the base, and another end is fixed with a second gear; and
   a driving device comprising an output shaft fixed with a driving gear, the driving device driving the driving gear to move along the output shaft to engage with either the first gear to drive the camera to rotate around an axis of the first shaft or the second gear to drive the base to rotate around an axis of the second shaft.

9. The camera assembly as claimed in claim 8, wherein the driving device is a step motor.

10. The camera assembly as claimed in claim 8, wherein the base defines a groove in an interior wall of the base, and the camera comprises a protruding portion on an exterior surface of the camera and received in the groove, and wherein when the camera rotates around the axis of the first shaft, the camera rotates along the groove of the base, and when the base rotates around the axis of the second shaft, the camera rotates together with the base by engagement of the protruding portion and the groove.

11. The camera assembly as claimed in claim 10, wherein the protruding portion is substantially in a shape of arc, and a center of the arc is located on the axis of the first shaft.

12. The camera assembly as claimed in claim 11, wherein the camera defines a third hole communication with the receiving hole of the camera, and the first shaft defines a through hole, and wherein one end of a third shaft received in the third hole of the camera to be fixed with the camera, another end of the third shaft passes through the through hole of the first shaft and is matched with a nut, and wherein an axis of the third shaft is collinear with that of the second shaft.

13. The camera assembly as claimed in claim 8, wherein the driving gear comprises a first driving gear and a second driving gear integrated with the first driving gear, and the first driving gear is capable of engaging with the first gear, the second driving gear is capable of engaging with the second gear.

14. The camera assembly as claimed in claim 13, wherein the first driving gear and the first gear are umbrella gears, and the second driving gear and the second gear are spur gears.

15. An electronic device comprising a camera assembly capable of adjusting an angle of a camera of the electronic device, the camera comprising a lens to and defining a receiving hole, the camera assembly comprising:
- a hollow base defining a receiving space to receive the camera, a first hole and a second hole both communicating with the receiving space, wherein the receiving hole is opposite to the first hole and the lens is opposite to the second hole, and the camera is capable of rotating relatively to the base;
- a first shaft, one end of the first shaft passing through the first hole and extending into the receiving hole of the camera to engage with the camera, and another end fixed with a first gear;
- a second shaft perpendicular to the first shaft, wherein one end of the second shaft is fixed with the base, and another end is fixed with a second gear; and
- a driving device comprising an output shaft fixed with a driving gear, the driving device driving the driving gear to move along the output shaft to engage with either the first gear to drive the camera to rotate around an axis of the first shaft or the second gear to drive the base to rotate around an axis of the second shaft.

16. The electronic device as claimed in claim 15, wherein the base defines a groove in an interior wall of the base, and the camera comprises a protruding portion on an exterior surface of the camera and received in the groove, and wherein when the camera rotates around the axis of the first shaft, the camera rotates along the groove of the base, and when the base rotates around the axis of the second shaft, the camera rotates together with the base by engagement of the protruding portion and the groove.

17. The electronic device as claimed in claim 16, wherein the protruding portion is substantially in a shape of arc, and a center of the arc is located on the axis of the first shaft.

18. The electronic device as claimed in claim 17, wherein the camera defines a third hole communication with the receiving hole of the camera, and the first shaft defines a through hole, and wherein one end of a third shaft received in the third hole of the camera to be fixed with the camera, another end of the third shaft passes through the through hole of the first shaft and is matched with a nut, and wherein an axis of the third shaft is collinear with that of the second shaft.

19. The electronic device as claimed in claim 15, wherein the driving gear comprises a first driving gear and a second driving gear integrated with the first driving gear, and the first driving gear is capable of engaging with the first gear, the second driving gear is capable of engaging with the second gear.

20. The electronic device as claimed in claim 19, wherein the first driving gear and the first gear are umbrella gears, and the second driving gear and the second gear are spur gears.

* * * * *